Patented Sept. 19, 1939

2,173,272

UNITED STATES PATENT OFFICE 2,173,272

PROCESS FOR SEPARATING DIVINYLACETYLENE AND ETHINYLBUTADIENE

Albert Smith Carter, Wilmington, Del., assignor to E. I. du Pont de Nemours & Company, Wilmington, Del., a corporation of Delaware No Drawing. Application July 27, 1937,
Serial No. 155,923

5 Claims. (Cl. 260—678)

This invention relates to polymerizable compounds, more particularly to aliphatic unsaturated compounds and still more particularly to hexadiene-1,3-yne-5, $$CH_2=CH—CH=CH—C\equiv CH,$$

hereinafter called ethinylbutadiene, and its isomer hexadiene-1,5-yne-3, $$CH_2=CH—C\equiv C—CH=CH_2,$$

hereinafter called divinylacetylene. More particularly, it relates to the purification of crude divinylacetylene and to the isolation, polymerization and use of ethinylbutadiene.

In U. S. Patent No. 1,811,959, Nieuwland describes a new process by which acetylene may be polymerized to non-benzenoid polymers of acetylene. Among the polymers of acetylene so obtained is divinylacetylene, first disclosed in the above patent. The process described in this patent, as well as in later patents of others, gives a divinylacetylene which is essentially constant boiling and which was thought to be a homogeneous substance.

If this divinylacetylene is tested for the presence of acetylenic hydrogen, however, positive results are obtained which indicate the presence of small amounts of a material other than divinylacetylene. The amounts of this other material vary with variations in the broad Nieuwland process and range from about 4% to about 10% by weight of the divinylacetylene even after extensive fractional distillation. This other material has been found to be hexadiene-1,3-yne-5, an isomer of divinylacetylene, having the structural formula $CH_2=CH—CH=CH—C\equiv CH$. There is thus a characteristic difference between divinylacetylene and ethinylbutadiene in that the ethinylbutadiene contains a $—C\equiv CH$ group whereas divinylacetylene does not.

It is an object of this invention to provide a process for obtaining divinylacetylene in a purer state than has hitherto been possible. A further object is to produce a new chemical compound, ethinylbutadiene. A still further object is to isolate ethinylbutadiene from crude divinylacetylene and obtain it in a form in which it is substantially free of divinylacetylene. Another object is to convert ethinylbutadiene into new and useful derivatives. Other objects will appear hereinafter.

These objects are accomplished by bringing divinylacetylene containing ethinylbutadiene into contact with a solution of a salt of cuprous copper, silver or mercury, which solution is more alkaline than about pH 6.9 or into contact with an aqueous sulfuric acid solution of mercuric sulfate, whereby the ethinylbutadiene is converted into a derivative which is readily separated from the divinylacetylene. In each case, the metal salt reacts with the $—C\equiv CH$ group in the ethinylbutadiene, although as pointed out more fully below, the mercuric sulfate derivative formed in the aqueous sulfuric acid solution is unstable and decomposes almost immediately into another compound.

The metal salt in the substantially neutral or alkaline solution is dissolved in a solvent in which the salt of ethinylbutadiene formed with the metal of the metal salt is insoluble so that when the ethinylbutadiene is brought into contact with the substantially neutral or alkaline metal salt solution a metal derivative of the ethinylbutadiene is precipitated. This derivative may be separated very easily from the divinylacetylene and may be further treated with alkali cyanides or dilute acids to regenerate and recover the ethinylbutadiene. Preferably, the solvent in the metal salt solution is water but it may also be another liquid having the requisite property, such as an alcohol.

When the sulfuric acid-mercuric sulfate solution is used, the ethinylbutadiene adds water forming a ketone and the ketone is then readily separated from the divinylacetylene which remains unreacted. This latter method is a preferred method for preparing divinylacetylene which is free of ethinylbutadiene altho when the metal derivatives of ethinylbutadiene are formed and separated an ethinylbutadiene-free divinylacetylene is also obtained.

Ethinylbutadiene obtainable from its metal salts, as indicated above, by treating the metal salts with alkali cyanides or dilute acids, is a volatile liquid, which upon analysis is found to have the composition $C_6H_6$. It is thus isomeric with divinylacetylene. Reaction of this hydrocarbon with maleic anhydride, as is more fully described hereinafter, shows that it contains a conjugated system of double bonds. This, together with the fact that it has an acetylenic hydrogen, limits the choice of formulas to

and

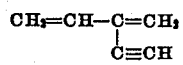

The behavior of the maleic anhydride addition product indicates that the second of these formulas is quite improbable for stereochemical reasons. The isomer of divinylacetylene is therefore hexadiene-1,3-yne-5 or ethinylbutadiene.

Ethinylbutadiene is a volatile colorless liquid which polymerizes to a viscous liquid, then to a hard solid when exposed to air. It is very sensitive to oxygen and light, rapidly becoming yellow. It can be stabilized by addition of small amounts of the usual antioxidants.

Divinylacetylene purified by removal of ethinylbutadiene no longer shows the presence of acetylenic hydrogen. It is then much less sensitive to light, remaining (when stabilized) water-white for more than two months, as contrasted with ordinary divinylacetylene which rapidly becomes yellow under the same conditions. The polymers derived from pure divinylacetylene show an improved stability towards light.

Table I shows some of the physical properties of pure divinylacetylene and pure ethinylbutadiene.

TABLE I

|  | Divinyl-acetylene | Ethinyl-butadiene |
|---|---|---|
| Melting point °C | −87.83 | −81.03 |
| Boiling point {250 mm °C | 52.5 | 51.0 |
| {760 mm °C | 85.0 | 83.4 |
| Density ($d_4^{20}$) | 0.7759 | 0.7734 |
| Refractive index ($N_D^{20}$) | 1.50474 | 1.50953 |
| Molecular refraction (obs.) | 29.82 | 30.16 |
| Molecular refraction (calcd.) | 26.97 | 26.97 |

The product formed when ethinylbutadiene is reacted with maleic anhydride is ethinyl-3-tetrahydro-1,2,3,6-phthalic acid which may readily be reduced to ethyl-3-hexahydrophthalic acid. With hydrogen chloride in the presence of cuprous chloride ethinylbutadiene reacts to form a polymerizable liquid having the composition $C_6H_7Cl$.

The invention will be better understood by a consideration of the following examples, which are intended as illustrations only, however, and are thus not intended to be construed as limitations. Throughout these examples the parts are given by weight unless otherwise indicated and as in the remainder of the specification and claims the temperatures are expressed as °C.

EXAMPLE 1.—*Isolation of ethinylbutadiene and purification of divinylacetylene*

Seven hundred and ninety parts of crude divinylacetylene (the fraction boiling from 48° to 52° at 250 mm.) was stirred for 30 minutes with a solution made by dissolving 100 parts of $Cu_2Cl_2$ in 300 parts of concentrated $NH_4OH$ and 100 parts of water and, while still warm, adding 5 parts of hydroxylamine hydrochloride which reduced most of the cupric copper present. A heavy orange-yellow precipitate of the cuprous acetylide formed and became suspended for the most part in the divinylacetylene layer. The major portion of the divinylacetylene was then distilled off at 100 mm., the temperature of the mixture being kept below 40°. The lumps of the copper precipitate were then broken up and dispersed by adding more ammonia and water and the distillation was continued at 30 mm. until water-insoluble material ceased to be condensed in a cold trap in the system. An additional 100 parts of water was then distilled to assure the complete removal of divinylacetylene. The orange precipitate was then filtered and washed with dilute ammonia, then ethanol containing a little ammonia. To further assure the removal of divinylacetylene, the precipitate was suspended again in ethanol, washed and air-dried. Ninety-five parts of product were obtained, corresponding to 6.7% of isomer in the divinylacetylene.

The precipitate, which was not wet by water, was suspended in water containing a wetting agent, treated with 100 parts of sodium cyanide and steam distilled. Thirty-five parts of ethinylbutadiene (4.4% of the crude divinylacetylene) came over rapidly, followed by 3 parts of a much less volatile liquid which was collected separately. The ethinylbutadiene was stabilized with thiodiphenylamine, dried with $MgSO_4$ and distilled at 250 mm. thru a short fractionating column. After collecting foreshots amounting to 4 parts a main fraction of 15 parts was collected. Both came over at 51°. There was considerable polymerization during distillation.

*Analysis.*—Calcd. for $C_6H_6$: C, 92.25; H, 7.75. Found C, 92.54; H, 8.13.

The physical constants listed in the table above were determined on samples of ethinylbutadiene and divinylacetylene separated in the manner described and redistilled with special care at reduced pressure in a $CO_2$ atmosphere immediately before use.

The slightly volatile material obtained after the ethinylbutadiene had come over in the distillation of the crude copper acetylide with sodium cyanide was collected from several runs, dried and distilled at 3 mm. Almost all came over at 70° as a colorless liquid of faint aromatic odor. It was very unsaturated toward bromine and gave a heavy precipitate with ammoniacal silver nitrate.

$N_D^{20}: 1.5272; d_4^{20}: 0.9327$

This proved to be a dimer.

*Analysis.*—Calcd. for $C_{12}H_{12}$: C, 92.25; H, 7.75. Found: C, 91.81; H, 7.69.

Divinylacetylene recovered from the above treatment was substantially free from acetylenic hydrogen. When stabilized with pyrogallol and stored in a corked bottle in diffused daylight, it remained practically water-white for more than two months. The pure, unstabilized divinylacetylene when kept in the presence of a small quantity of air gelled in 6 hours at 85° or 6 days at room temperature. When distilled and sealed in high vacuum in the absence of air it still gelled in 6 days at room temperature if exposed to bright daylight and occasional direct sunlight. If stored in the dark, one month was required for gelation. Polymers formed in the dark were very nearly colorless; under other conditions they were pale yellow. The rapidity of gelation of pure divinylacetylene is greater than that observed for divinylacetylene containing ethinylbutadiene.

A thin layer of a viscous toluene solution of polymerized divinylacetylene (free from ethinylbutadiene) dried in 1.5 hours to a hard, smooth, very nearly colorless film. Exposed to bright sunlight, it darkened rapidly to the same depth of color as a simultaneously exposed film of ordinary polymerized divinylacetylene. The film derived from the pure divinylacetylene measured 0.00036 inch in thickness, however, while the film of ordinary polymerized divinylacetylene was only 0.00018 inch thick. Long exposure to sunlight did not further change the color. It therefore appears that the pure divinylacetylene gives polymers of somewhat improved light stability.

EXAMPLE 2.—*Polymerization of ethinylbutadiene*

A sample of ethinylbutadiene (without stabilizer) standing exposed to air for 6 days was not visibly altered except for the formation of a deep red-brown color. Heating for 7 hours on a steam bath increased the viscosity without causing gelation. On standing 6 days more at room temperature, the liquid gradually thickened and finally formed a soft gel similar to that obtained from divinylacetylene but much darker.

It gradually became hard and brittle. Films closely resembling those obtainable from the synthetic drying oil described in Collins U. S. Patent 1,812,849 were obtained when ethinylbutadiene, polymerized to the viscous stage, was poured into ethanol, the precipitate dissolved in benzene and the solution allowed to dry on a glass plate.

EXAMPLE 3.—*Addition of hydrogen chloride to ethinylbutadiene*

Seven and eight tenths parts of ethinylbutadiene was shaken with 17.5 parts of 37% HCl containing 2.5 parts of $Cu_2Cl_2$, cooling in ice to take up the heat of reaction. After standing for 1 hour at room temperature, the resulting emulsion was shaken with ammonium chloride solution, then with water, to remove most of the $Cu_2Cl_2$ and HCl, and was then distilled with steam. The non-aqueous distillate was shaken with ammoniacal $Cu_2Cl_2$ solution to remove the unchanged ethinylbutadiene and was then washed with water, dried and distilled in vacuo. The principal fraction (2 parts) boiling at 54°–56° at 50 mm. pressure, was a colorless liquid.

*Analysis.*—Calcd. for $C_6H_7Cl$: C, 62.87; H, 6.17. Found: C, 62.63; H, 5.91.

It polymerized rapidly on exposure to air, becoming quite viscous in 3 days. It gradually became a soft, tacky, brownish solid, and after one month had definite elastic properties. When exposed in thin films, it was hard and brittle.

EXAMPLE 4.—*Ethinylbutadiene and maleic anhydride*

Nineteen and five-tenths parts of ethinylbutadiene and 24.5 parts of maleic anhydride were heated for four hours at 75° in a closed flask. The resulting viscous liquid was poured into ice water containing a slight excess of sodium hydroxide and the small insoluble residue collected with ether. On acidifying the alkaline solution, a brown, sticky precipitate separated, followed by four parts of long white needles which were shown to be sodium acid maleate. The acid mother liquor on exhaustive extraction with ether gave 18 parts of crystalline material which yielded 7.7 parts of short prisms (melting point 148°) when recrystallized from water. The material was recrystallized for analysis from ethyl acetate, giving long prisms melting at 147°.

*Analysis.*—Calcd. for $C_{10}H_{10}O_4$: C, 61.82; H, 5.20. Found: C, 61.62; H, 5.21. Neutralization equivalent found, 103.7. Calcd. for the dibasic acid, 97.0.

*Hydrogenation of the maleic anhydride addition product*

Four and eighty-five hundredths parts of the addition product in 20 parts of ethanol was hydrogenated at 30 pounds pressure with 0.05 part of $PtO_2$ catalyst. Hydrogen was absorbed in an amount equivalent to 2.7 moles per mole of acid. The colorless syrup which remained on evaporating the solvent partly crystallized on standing and gave 4 parts of crystalline material, melting point 110°, when recrystallized from 50% ethanol. This was recrystallized for analysis by dissolving in acetic acid and diluting with water. The crystals melted at 114°.

*Analysis.*—Calcd. for $C_{10}H_{16}O_4$: C, 59.97; H, 8.06. Neutralization equivalent, 100.1 (dibasic). Found: C, 60.39; H, 7.95. Neutralization equivalent, 104.7.

*Anhydride and anilide of hydrogenated addition product*

One and five-tenths parts of the hydrogenated acid was heated at 2 mm. pressure slightly above its melting point, water was evolved and at a higher temperature the anhydride distilled almost completely as a colorless liquid, $$n_D^{20}: 1.4825$$

On exposure to moist air, it was reconverted to the acid.

The anhydride, stirred with a slight excess of aniline, gave a crystalline mass which, when recrystallized from ethanol, gave flat, shiny needles melting at 191°–193°.

*Analysis.*—Calcd. for $C_{16}H_{21}O_3N$: C, 69.77; H, 7.70. Found: C, 69.46; H, 7.39.

EXAMPLE 5.—*Cuprous salt of ethinylbutadiene*

A stream of nitrogen saturated with the hydrocarbon was passed into a solution made by dissolving cuprous chloride in ammonia, reducing the cupric copper with hydroxylamine hydrochloride, and diluting with an equal volume of ethanol. The orange-yellow precipitate was filtered, washed with ethanol containing ammonia, and air-dried. When dropped in small quantities upon a melting point block it decomposed with a flash after several seconds' contact when the block was at 150°, and after progressively shorter times at higher temperatures. No melting was observed, however, at any temperature up to 210°.

This compound was insoluble in boiling acetone, boiling ethanol, and boiling benzene. It decomposed with a flash when touched with a drop of concentrated nitric acid. When warmed with sodium cyanide solution or dilute nitric acid, it gave a pronounced odor of ethinylbutadiene.

*Analysis.*—Calcd. for $CuC_6H_5$: Cu, 45.21. Found: Cu, 44.72, 45.36.

EXAMPLE 6.—*Silver salt of ethinylbutadiene*

A stream of nitrogen was passed thru ethinylbutadiene and then into a solution of silver nitrate in ethanol to which had been added enough ammonia to dissolve the silver oxide precipitate. A fine white crystalline precipitate of the silver derivative was formed at once. This was filtered and washed with ethanol, then air-dried. When dropped in small quantities upon the melting point block, it turned black at temperatures between 100° and 155°; at 155° it melted and almost immediately decomposed with a flash, while above 155° it decomposed instantaneously without melting.

It was insoluble in boiling acetone, boiling benzene, boiling ethanol, and in concentrated ammonia. It dissolved readily on warming with sodium cyanide solution or dilute nitric acid, giving a pronounced odor of ethinylbutadiene.

*Analysis.*—Calcd. for $AgC_6H_5$: C, 38.93; H, 2.73. Found: C, 38.67; H, 2.83.

EXAMPLE 7.—*Mercury salt of ethinylbutadiene*

The reagent consisted of 132 parts of mercuric chloride and 326 parts of potassium iodide dissolved in 326 parts of water and made alkaline with 275 parts of 10% sodium hydroxide. This was shaken for 14 hours with 160 parts of ethanol and 500 parts of crude divinylacetylene. The precipitate of mercury salt, after washing with ethanol, and air drying, weighed 85 parts. A portion crystallized from acetone gave a white product melting between 165° and 175° on a melting point block and decomposing above 175°.

Analysis.—Calcd. for $Hg(C_6H_5)_2$. C, 40.60; H 2.84 Found: C, 40.64; H, 2.73.

When ethinylbutadiene is to be precipitated in the form of one of its metal salts, it is preferable to effect the precipitation in an aqueous alkaline solution having a pH which is substantially on the alkaline side. As indicated above, a slightly acid pH does not render the process inoperable, altho a strongly acid pH does have such a tendency. As will be observed from the above examples, a suitable alkalinity may be produced by the incorporation of a basic substance such as the ammonium hydroxide used with cuprous chloride.

The precipitation of ethinylbutadiene in the form of its metal salts may be carried out, as is apparent from the above, in the presence or absence of divinylacetylene. Generally, the salt forms at once at ordinary temperature, altho when a mercury salt is employed as the precipitant, it is advisable to agitate the reaction mixture for a considerable period to obtain maximum yields. Preferably, the metal salt which is to react with the ethinylbutadiene is present in molecular excess over the ethinylbutadiene. After its formation, the salt of ethinylbutadiene may be separated and purified as desired. Any divinylacetaylene present may be distilled off, preferably at subatmospheric pressure and recovered.

In recovering the ethinylbutadiene from its metal salts, the presence of a wetting agent during the treatment with dilute acids or alkali cyanides will be found to be beneficial. Preferably, also the acid or cyanide will be added in substantial molecular excess to promote maximum recovery. Suitable dilute acids to be used in effecting the regeneration of the ethinylbutadiene include dilute nitric, dilute sulfuric, dilute phosphoric, and dilute hydrochloric acids. Cyanides capable of decomposing the metal salts of ethinylbutadiene are, for example, potassium cyanide and sodium cyanide.

Ethinylbutadiene is readily separated after the treatment with cyanides or dilute acids by either steam distillation or by solvent extraction. It may be further purified by fractional distillation. It should be noted, however, that the ethinylbutadiene is preferably stabilized against polymerization during distillation by the incorporation of an antioxidant.

A preferred method of separating divinylacetylene and ethinylbutadiene is precipitation of the latter in the form of a copper salt. Generally, this precipitation is carried out in the presence of water but in the formation of the mercury and silver salts as well as in the formation of the copper salt, another medium in which the salts are insoluble, such as an alcohol, for example, methanol, ethanol, and propanol, may be used. This method is particularly preferred where it is desired to recover the ethinylbutadiene as well as to purify the divinylacetylene but where recovery of ethinylbutadiene is not particularly desired, it has generally been found preferable to purify the divinylacetylene by hydrating the ethinylbutadiene as in the following example and then separating the divinylacetylene and the hydrated product by distillation.

EXAMPLE 8

A flask is equipped with an agitator, a dropping funnel and a condenser set up for steam distillation. Air in the apparatus is displaced with nitrogen and 1500 to 1600 parts by volume of crude divinylacetylene containing approximately 0.1% of hydroquinone is introduced and the agitation started. With the apparatus under a slight pressure of nitrogen to maintain oxygen-free conditions, 1250 parts by volume of the following stock solution is added to the divinylacetylene thru the dropping funnel during a period of 15 to 20 minutes:

| | Parts |
|---|---|
| Mercuric sulfate | 345 |
| Copper sulfate | 30 |
| Water | 2850 |
| 96% sulfuric acid | 1025 |

During this addition, the temperature is held below 32° C. by means of a water bath; mixing is continued for one hour, and at the end of this period, a low pressure steam jet is introduced and the volatile constituents are distilled thru the condenser into a receiver swept with nitrogen and containing 1 part of hydroquinone. After approximately 1100 to 1200 parts by volume of oil with a specific gravity of 0.77–0.80 is obtained, the rate of steam distillation decreases perceptibly and a yellowish distillate begins to come over. This yellowish oil may be collected separately and will supply approximately 100 to 125 parts by volume of crude 1,3-hexadiene-5-one, specific gravity 0.84–0.90.

The divinylacetylene distillate is tested with ammoniacal cuprous chloride; if a yellow precipitate is formed, indicating that acetylene hydrogen is present, the above treatment is repeated. If the distillate gives no yellow precipitate, indicating that the hydration treatment has completely removed the acetylenic isomer, the divinylacetylene is fractionated under reduced pressure to obtain a pure product, free of the byproduct ketone. Divinylacetylene is collected at approximately 45° to 45.5° C. at 200 mm. pressure.

In the above example, the success in completely removing the ethinylbutadiene in a single treatment will depend upon its concentration in the crude divinylacetylene. If the ethinylbutadiene is high, it will be necessary to repeat the hydration, or, if preferred, the relative concentration of divinylacetylene to the hydration catalyst may be reduced and the time of contact prolonged, thus accomplishing complete removal in a single treatment. The composition of the hydrating mixture is not critical. The strength of the sulfuric acid may vary between 20 and 45% in the mixture; copper sulfate need not be added, but assists in maintaining the activity of the hydration mixture; the concentration of mercury may vary from 0 to saturation, the activity varying correspondingly, but being most efficient in the region of 7 to 10%. We have also found that a satisfactory mixture may contain potassium bisulfate in place of a part of the sulfuric acid.

If it is desirable to recover the 1,3-hexadiene-5-one, the steam distillation of the hydrated divinylacetylene may be continued until the yellow oil practically ceases to come over. This oil may be vacuum fractionated to separate divinylacetylene which it contains, collecting the pure ketone at 27° to 30° at 1 mm. pressure (145° C. at 760 mm.).

As regards the polymerization of ethinylbutadiene, numerous and well-known variations may be introduced, concerning principally temperature, pressure, light, catalysts, inhibitors, etc. Ethinylbutadiene may be polymerized by itself or mixed with other compounds, polymerizable or not.

The same considerations apply to the polymerization of the hydrochloride of ethinylbutadiene. Furthermore, it must be understood that the addition of hydrochloric acid to this hydrocarbon may be carried out under other conditions susceptible to yield different products. For example, in the absence of cuprous chloride, a different hydrochloride could be obtained; in the vapor phase, with other catalysts or under more drastic conditions, compounds containing 2 or more molecules of HCl per mole of hydrocarbon could be obtained.

In addition to the above described methods for separating divinylacetylene and ethinylbutadiene, it is also possible to effect a separation by precipitating the ethinylbutadiene in the form of its alkali and alkaline earth metal salts, such as its sodium or calcium salts. The precipitation is effected under anhydrous conditions but the free metals are used as the precipitants instead of their salts as in the case of copper, etc. Divinylacetylene may then be separated from the precipitated salts by filtration under oxygen-free conditions. Some ethinylbutadiene may be recovered from the alkali salts by washing the precipitate free of divinylacetylene with ether and carefully hydrolyzing with water or a water and ethanol mixture, for example. Preferably, the precipitation of the alkali salts is carried out in the presence of an inert solvent for the divinylacetylene, such as ether or liquid ammonia. It is also possible to effect the precipitation with alkali or alkaline earth metal amides instead of the free metals.

A physical method rather than a chemical one may be adopted for extracting substantial portions of the ethinylbutadiene present in crude divinylacetylene. This method is based on the different solubilities of ethinylbutadiene and divinylacetylene in dilute ethanol, altho other solvents may be used. Reasonably pure ethinylbutadiene may be obtained in fair yields by means of a series of systematic extractions which do not involve a great number of steps. Suitable solvents are those which have a substantially different distribution coefficient for the two hydrocarbons. The principle of this method is illustrated in Example 9.

EXAMPLE 9.—*Extraction of ethinylbutadiene from crude divinylacetylene*

One hundred parts of crude divinylacetylene containing 10.2% of ethinylbutadiene was extracted with successive 100 part portions of 70% ethanol. The total hydrocarbon present in alcoholic solution was determined roughly by diluting and washing with ice water and drying and weighing the insoluble residue. Ethinylbutadiene was determined by precipitation with a solution of silver nitrate in ethanol. The results are listed in Table II below:

TABLE II

Successive extraction of 100 parts of crude DVA containing 10.2% of isomer with 100 part portions of 70% ethanol

| Extract No. | 1 | 2 | 3 | Residue |
|---|---|---|---|---|
| Weight of extract | 84 g. | 136 g. | 166 | 12 |
| Percent hydrocarbons | 12 | 22 | 26 | 67 |
| Percent isomer | 2.2 | 2.9 | 2.8 | 5.9 |
| Weight hydrocarbons | 10.1 g. | 30 | 43 | 8.0 |
| Weight isomer | 1.82 | 3.9 | 4.7 | 0.7 |
| Percent isomer in extracted H. C. | 18.0 | 13.1 | 9.2 | *8.8 |
| Percent of original H. C. extracted | 10.1 | 30 | 43 | *8.0 |
| Percent of original isomer extracted | 17.6 | 38 | 46 | **6.9 |

Temperature 20°.
*Percent in residual hydrocarbons.
**Percent of original material in residue.

This invention provides a simple and convenient method of obtaining at the same time pure divinylacetylene and pure ethinylbutadiene from the crude divinylacetylene. The usefulness of the invention is thus obvious since no other method of separating these two hydrocarbons is known previous to this invention. Pure divinylacetylene, as has been mentioned above, gives polymers having an increased stability toward light; on the other hand, it remains (when stabilized) colorless and unaltered for long periods of time.

Ethinylbutadiene is a new compound susceptible of a variety of applications. Its polymers may be used to the same purpose as divinylacetylene polymers (synthetic resins, drying oils, etc.) and as modifying agents for other resins and compositions. Ethinylbutadiene, thru its unsaturation and acetylenic hydrogen, is well adapted to the synthesis of almost innumerable useful derivatives of which a large number will themselves be polymerizable. Among these derivatives may be cited the reaction products obtainable with $Cl_2$, $Br_2$, HCl, HBr, alcohols, phenols, and acids as well as the hydration product, partial hydrogenation products, etc.

It is apparent that many widely different embodiments of this invention may be made without departing from the spirit and scope thereof and therefore it is not intended to be limited except as indicated in the appended claims.

I claim:

1. The method of preparing divinylacetylene which is substantially free of ethinylbutadiene, which comprises bringing a divinylacetylene composition containing ethinylbutadiene into contact with an aqueous sulfuric acid solution of mercuric sulfate.

2. The method of preparing divinylacetylene which is substantially free of ethinylbutadiene, which comprises bringing a divinylacetylene composition containing ethinylbutadiene into contact with an aqueous sulfuric acid solution of mercuric sulfate, then separating the divinylacetylene by steam distillation.

3. The method of preparing divinylacetylene which is substantially free of ethinylbutadiene, which comprises bringing crude divinylacetylene containing ethinylbutadiene into contact with an aqueous sulfuric acid solution of mercuric sulfate containing between about 20% to about 45% of sulfuric acid, and from a trace to an amount of mercuric sulfate which will saturate the solution, and then separating the divinylacetylene by steam distillation.

4. The process of claim 3, further characterized in that the amount of mercuric sulfate present is from about 7% to about 10%.

5. The process which comprises bringing crude divinylacetylene containing ethinylbutadiene into contact with an aqueous sulfuric acid solution of mercuric sulfate containing from about 20% to about 45% of sulfuric acid, and from about 7% to about 10% of mercuric sulfate, and also containing a small amount of copper sulfate under oxygen-free conditions while subjecting the mixture to agitation and cooling to prevent the temperature from rising substantially above room temperature until the reaction is substantially complete, and thereafter separating the volatile constituents by steam distillation, collecting separately the divinylacetylene which comes over first, and further purifying the divinylacetylene so collected by fractional distillation.

ALBERT S. CARTER.